United States Patent
Hayashi et al.

(10) Patent No.: US 11,411,880 B2
(45) Date of Patent: Aug. 9, 2022

(54) CONNECTION MANAGEMENT UNIT AND CONNECTION MANAGEMENT METHOD

(71) Applicant: NEC Corporation, Tokyo (JP)

(72) Inventors: Yuki Hayashi, Tokyo (JP); Jun Suzuki, Tokyo (JP); Masaki Kan, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/476,905

(22) PCT Filed: Jan. 9, 2018

(86) PCT No.: PCT/JP2018/000149
§ 371 (c)(1),
(2) Date: Jul. 10, 2019

(87) PCT Pub. No.: WO2018/131550
PCT Pub. Date: Jul. 19, 2018

(65) Prior Publication Data
US 2019/0334826 A1 Oct. 31, 2019

(30) Foreign Application Priority Data
Jan. 13, 2017 (JP) .............................. JP2017-004389

(51) Int. Cl.
*H04L 47/32* (2022.01)
*G06F 11/07* (2006.01)
(Continued)

(52) U.S. Cl.
CPC .............. *H04L 47/32* (2013.01); *G06F 11/07* (2013.01); *G06F 11/30* (2013.01); *G06F 13/36* (2013.01)

(58) Field of Classification Search
CPC .......... H04L 47/32; G06F 11/07; G06F 11/30; G06F 13/36
See application file for complete search history.

(56) References Cited

U.S. PATENT DOCUMENTS 5,448,730 A * 9/1995 Bakita ...................... G06F 9/44
713/502
9,817,786 B1 * 11/2017 Khan ................... G06F 13/4221
(Continued)

FOREIGN PATENT DOCUMENTS

JP 58-24812 B2 5/1983
JP 2001-175631 A 6/2001
(Continued)

OTHER PUBLICATIONS

"PCI Express® Base Specification Revision 2.1", PCI-SIG, Mar. 4, 2009, pp. 1-704 (total 704 pages).
(Continued)

*Primary Examiner* — Eric T Oberly

(57) ABSTRACT

Provided are a connection management mechanism and a connection management method with which computer bus connections can be managed such that failures and freezes do not occur in a computer system when delays and packet losses occur. A connection management unit, which is used in computer bus communication in which packets are transmitted between a request source and a request destination, has a dummy return packet generation/transmission function wherein a dummy return packet is generated and is transmitted to the request source when a delay or loss occurs in a return packet transmitted from the request destination, and/or a filter function wherein, after transmission of the dummy return packet, a legitimate return packet arriving from the request destination is discarded.

18 Claims, 15 Drawing Sheets

(51) Int. Cl.
*G06F 11/30* (2006.01)
*G06F 13/36* (2006.01)

(56) References Cited

U.S. PATENT DOCUMENTS

| | | | |
|---|---|---|---|
| 2006/0136607 A1* | 6/2006 | Shirano | G06F 13/385 710/1 |
| 2008/0250097 A1 | 10/2008 | Angelini et al. | |
| 2011/0320638 A1* | 12/2011 | Coneski | G06F 13/385 710/5 |
| 2013/0177020 A1* | 7/2013 | Miyazaki | H04L 45/74 370/392 |
| 2013/0246663 A1* | 9/2013 | Raveendran | G06F 9/4411 710/8 |
| 2014/0344632 A1* | 11/2014 | Ge | G06F 13/4221 714/49 |
| 2017/0374044 A1* | 12/2017 | Alyubi | H04L 63/06 |
| 2018/0300261 A1* | 10/2018 | Narayanasamy | G06F 13/4282 |

FOREIGN PATENT DOCUMENTS

| | | |
|---|---|---|
| JP | 2006-178688 A | 7/2006 |
| JP | 2008-204245 A | 9/2008 |
| JP | 2010-524072 A | 7/2010 |
| JP | 2012-138694 A | 7/2012 |
| JP | 2012138694 A * | 7/2012 |
| JP | 2015524122 A * | 5/2013 |
| JP | 2015-524122 A | 8/2015 |

OTHER PUBLICATIONS

Suzuki et al., "ExpressEther—Ethernet-based Virtualization Technology for Reconfigurable Hardware Platform," Proceeding of the 14th IEEE Symposium on High Performance Interconnects (HOTI'06), Stanford, CA, Aug. 2006, pp. 45-51 (total 7 pages).

International Search Report for PCT/JP2018/000149 dated Mar. 20, 2018 [PCT/ISA/210].

Written Opinion for PCT/JP2018/000149 dated Mar. 20, 2018 [PCT/ISA/237].

Japanese Office Action for JP Application No. 2018-561351 dated Feb. 22, 2022 with English Translation.

* cited by examiner

Fig. 5

| Device | Transaction ID | Time Stamp | Packet Information |
|---|---|---|---|
| 0 | [Tag Number]+[Address(32bit)] | 0.012 | [Packet Info] |
| 0 | [Tag Number]+[Address(64bit)] | 0.021 | [Packet Info] |
| 0 | [Tag Number]+[Bus/Device/Function] | 0.056 | [Packet Info] |
| ... | ... | ... | ... |

131 ns of behaviors in which a completion timeout is set
CONNECTION MANAGEMENT UNIT AND CONNECTION MANAGEMENT METHOD This application is a National Stage Entry of PCT/JP2018/000149 filed on Jan. 9, 2018, which claims priority from Japanese Patent Application 2017-004389 filed on Jan. 13, 2017, the contents of all of which are incorporated herein by reference, in their entirety.

TECHNICAL FIELD

The present invention relates to a connection management unit and a connection management method, and, in particular, to connection management of a computer bus.

BACKGROUND ART

In a computer system, a PCI Express (Registered Trademark) protocol is widely used as a bus standard for connecting an input/output (I/O) device (Non-Patent Literature 1 (NPL1)). The PCI Express protocol is generally used to connect an external device such as a solid state drive (SSD), a graphics processing unit (GPU), and the like of a computer. Further, recently, a technique such as PCI Express over Ethernet (Registered Trademark) or the like for encapsulating PCI Express with a network packet has emerged (Non-Patent Literature 2 (NPL2)).

In these PCI Express protocols, in order to perform communication between a central processing unit (CPU) and an I/O device, mainly, three packets of a write request, a read request, and a completion are defined. A write request is a memory write instruction, a read request is a memory read instruction, and a completion is a reply packet to a write request and a read request. When receiving a request packet, one of a CPU and an I/O device returns an appropriate completion and issues a report to an appropriate memory address or executes memory writing and thereby achieves communication.

In PCI Express, a timeout can be set with respect to a completion packet for a request packet, and when a timeout occurs, an error is returned, instead of a completion. However, PCI Express is a computer internal bus and is not designed for an assumption that a long delay is inserted in a packet, and therefore, a problem occurs when there is a long delay in a path.

FIG. 13, FIG. 14, FIG. 15, and FIG. 16 illustrate combinations of behaviors in which a completion timeout is set and is not set with respect to PCI Express communication, and a packet is lost and is delayed.

FIG. 13 illustrates a behavior in which when timeout detection is executed in a PCI Express protocol, a completion packet is subjected to packet loss. In this case, a completion packet for a request packet transmitted by a driver is not returned due to packet loss, a timeout is detected, and an error massage is returned to a request generation side. Thereafter, the driver having received the error massage executes error handling. This case is a behavior as supposed and an operation is executed without a particular problem. Further, while FIG. 13, FIG. 14, FIG. 15, and FIG. 16 illustrate a case in which a driver transmits a request packet, a similar thing applies to a case in which a request packet is transmitted from an I/O device.

FIG. 14 illustrates a behavior when timeout detection is executed in a PCI Express protocol, and a completion packet arrives with a delay after a timeout. In this case, a timeout is detected before a completion packet for a request packet transmitted by a driver is returned and an error massage is returned to a request generation side. Thereafter, a legitimate completion packet is returned to the driver. When a completion for the same request is returned after returning of an error massage due to a timeout in this manner, a conflict in address writing occurs and then a failure or a freeze occurs in computer software.

FIG. 15 illustrates a behavior when timeout detection is not executed in a PCI Express protocol and a completion packet is subjected to packet loss. In this case, a completion packet for a request packet transmitted by a driver is not returned due to packet loss. Therefore, the driver executes an operation for continuing to wait for a completion for a request, and therefore a computer system freezes.

FIG. 16 illustrates a behavior when timeout detection is not executed in a PCI Express protocol and a completion packet arrives with a delay. In this case, a completion packet for a request packet transmitted by a driver is returned with a delay due to a network delay. In this case, although a completion is delayed, a normal operation can be continued.

As described in the above four cases, when a timeout is detected in a PCI Express protocol, an error reply and a legitimate completion reply for a request may be doubly returned due to an influence of a network delay. An error reply and a legitimate completion reply for a request are doubly returned and therefore a failure occurs in a computer system. When timeout detection is not executed in a PCI Express protocol, a completion for a request is not returned due to an influence of packet loss and then a failure occurs in a computer system.

A PCI Express protocol is a protocol for a computer internal bus, and therefore a timeout mechanism is introduced by considering a packet loss due to a physical failure of a bus. However, the timeout mechanism is not designed in consideration of a packet delay on a bus, and therefore it is difficult to avoid a fault of a computer bus by using the setting. These phenomena markedly appear in PCI Express communication using a network such as, specifically, PCI Express over Ethernet.

Patent Literature 1 (PTL1) relates to a data communication device of a high-speed serial communication standard such as PCI Express and proposes that a dummy request packet that does not except a data response is continuously transmitted and thereby a retransmission overhead during synchronous transfer is reduced.

Patent Literature 2 (PTL2) relates to input/output device management of a data processing device and proposes that timeout detection for a ready signal response wait from an input/output device is executed, a pseudo-ready signal is generated at a timeout, and a data transfer access of this time is terminated. PTL2 proposes that termination of the data transfer access under an abnormal state is reflected in a processing content, based on such control.

Patent Literature 3 (PTL3) relates to middleware mounted with an enterprise service bus that mutually connects different software applications. PTL3 proposes that a reception service request arriving from an end client is transferred to a primary server and is duplicated on one or a plurality of secondary servers; and a verifier receives all responses from the primary or secondary server, returns a first received response to the end client, and discards subsequent responses.

CITATION LIST

Patent Literature

[PTL1] Japanese Patent Application Publication No. 2008-204245
[PTL2] Japanese Examined Patent Application Publication No. S58-24812
[PTL3] Japanese Translation of PCT International Application Publication No. 2010-524072

Non Patent Literature

[NPL1] "PCI Express Base Specification Revision 2.1", PCI-SIG, 2009
[NPL2] J. Suzuki et al., "ExpressEther—Ethernet-based Virtualization Technology for Reconfigurable Hardware Platform," in Proc. IEEE Symposium on High Performance Interconnects (HOTI'06), Stanford, Calif., August 2006, pp. 45-51

SUMMARY OF INVENTION

Technical Problem

The connection management technique described above has the following issue. Specifically, when a delay or a packet loss occurs in a computer bus including PCI Express, a failure or a freeze may occur in a computer system.

The reason is that when timeout detection is executed, a delayed packet is returned after a completion for a request packet is timed out and a reply to the same request is doubly processed. Further, when timeout detection is not executed, a reply is not returned when a completion for a request packet is subjected to packet loss.

An object of the present invention is to provide a connection management unit and a connection management method that execute connection management of a computer bus in such a way that a failure or a freeze does not occur in a computer system when a delay or a packet loss occurs.

Solution to Problem

To achieve the above-mentioned object, a connection management unit is used in a communication of a computer bus that transmits a packet between a request source and a request destination, and includes: a dummy return packet generation/transmission function that, when a delay or a loss occurs in a return packet transmitted from the request destination, generates a dummy return packet and transmits the generated packet to the request source; and/or a filter function that discards a legitimate return packet arriving from the request destination after transmission of the dummy return packet.

A connection management method according to an example of the present application, includes: when, in communication of a computer bus that transmits a packet between a request source and a request destination, a delay or a loss occurs in a return packet transmitted from the request destination, generating a dummy return packet and transmitting the generated packet to the request source; and discarding a legitimate return packet arriving from the request destination after transmission of the dummy return packet.

A connection management method according to another example of the present application, includes: when, in communication of a computer bus that transmits a packet between a request source and a request destination, a delay or a loss occurs in a return packet transmitted from the request destination, issuing an error report to the request source; and discarding a legitimate return packet arriving from the request destination after the error report.

Advantageous Effects of Invention

The present invention can execute connection management of a computer bus in such a way that a failure or a freeze does not occur in a computer system when a delay or a packet loss occurs.

BRIEF DESCRIPTION OF DRAWINGS

FIG. 5 is a diagram illustrating details of a transaction ID table of the connection management unit according to the first example embodiment of the present invention.

EXAMPLE EMBODIMENT

Preferred example embodiments of the present invention are described in detail with reference to the drawings.

First Example Embodiment

Figure 1:
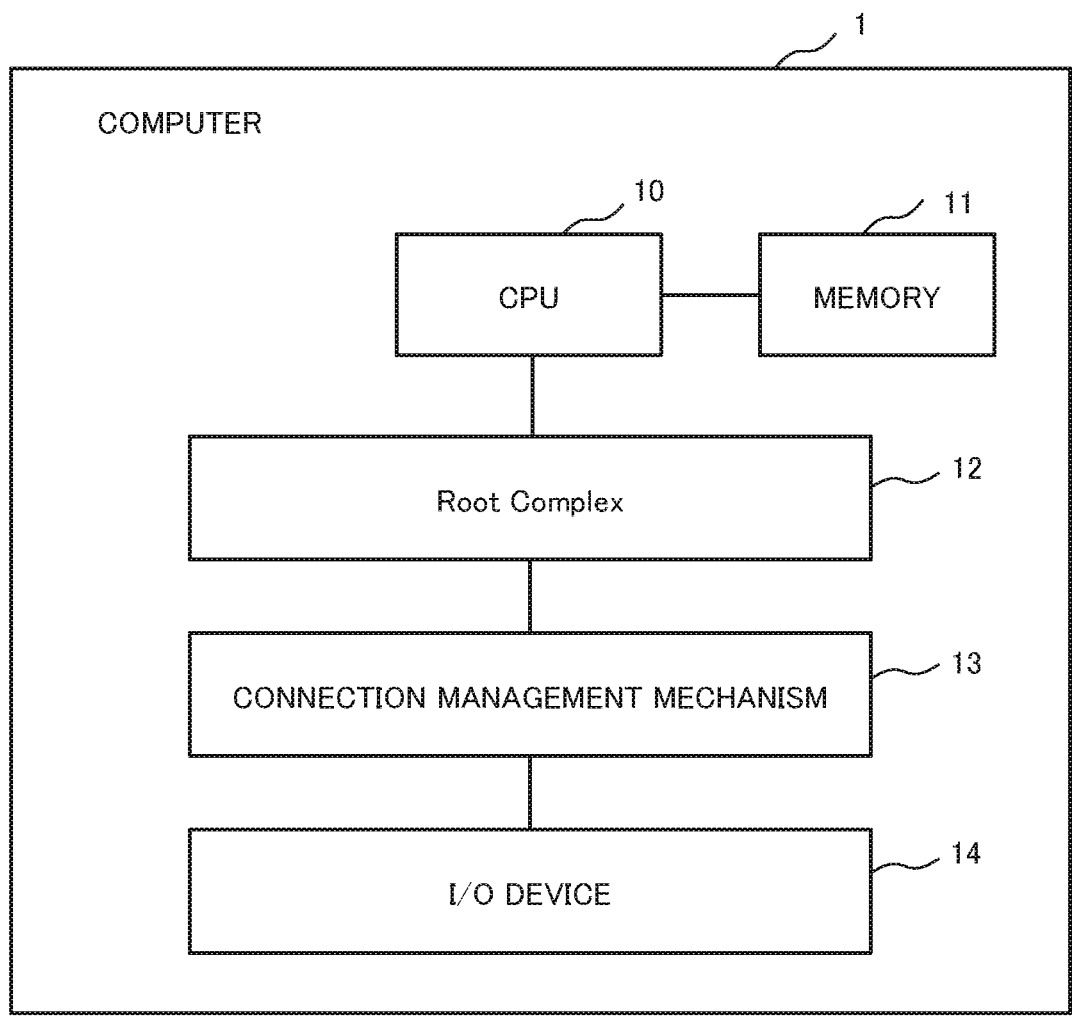
FIG. 1 is a block diagram illustrating a computer including a connection management unit according to a first example embodiment of the present invention.
Figure 2:
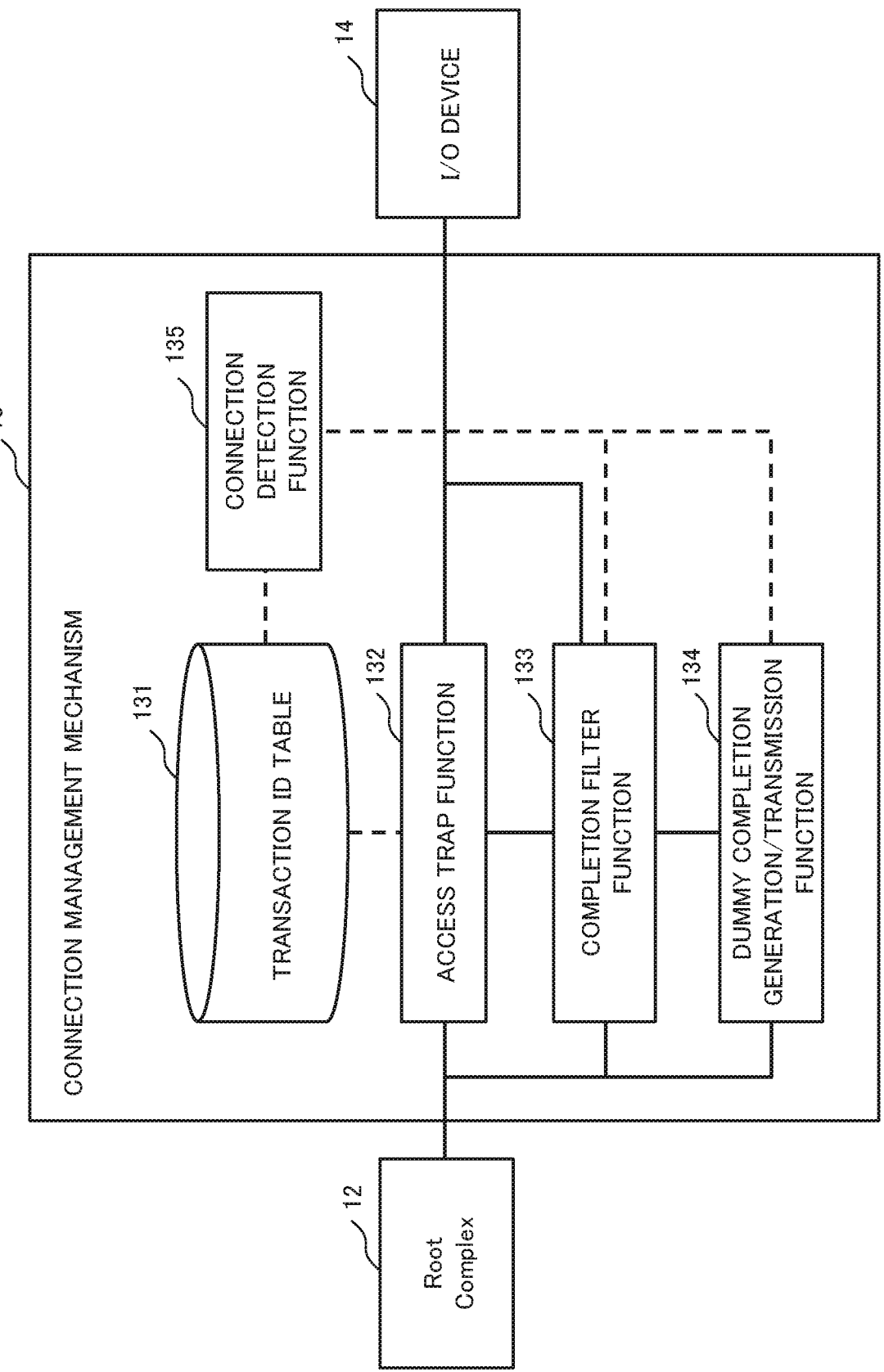
FIG. 2 is a block diagram illustrating details of the connection management mechanism in FIG. 1.
Figure 3:
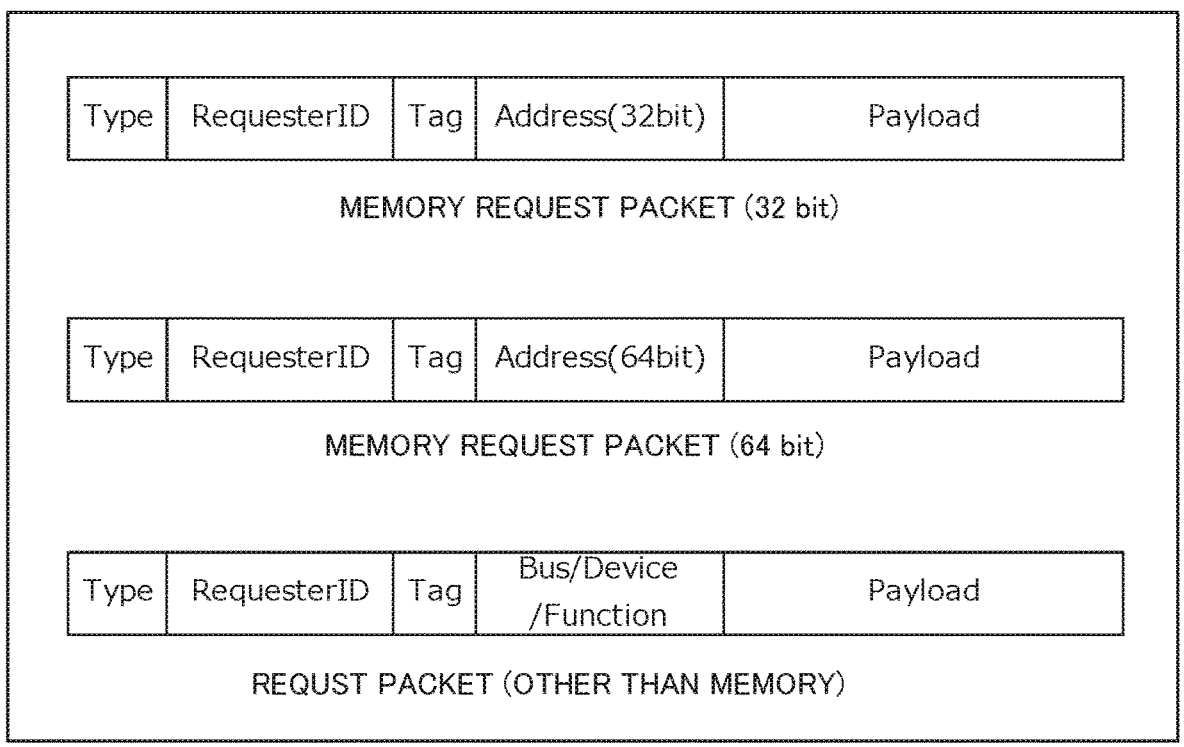
FIG. 3 is a diagram illustrating a format of a request packet that passes through a computer bus.

First, a connection management unit and a connection management method according to a first example embodiment of the present invention are described. FIG. 1 is a block diagram illustrating an entire configuration of a computer including the connection management unit according to the first example embodiment of the present invention. FIG. 2 is a block diagram illustrating details of a connection management mechanism 13 in a computer 1 in FIG. 1. FIG. 3 is one example of a format of a request packet to be trapped by an access trap function of the first example embodiment of the present invention.

Figure 4:
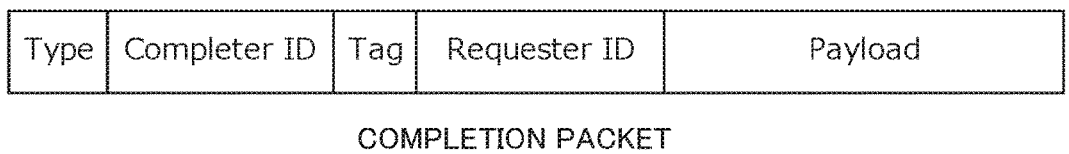
FIG. 4 is a diagram illustrating a format of a completion packet that passes through a computer bus.

FIG. 4 is an example of a completion packet to be transmitted by a dummy completion generation/transmission function of the first example embodiment of the present invention. FIG. 5 is a table illustrating an example of a transaction ID table of the first example embodiment of the present invention.

[Description of a Configuration]

The computer 1 in FIG. 1 includes a connection management mechanism 13 as one example of the connection management unit according to the first example embodiment of the present invention. The computer 1 in FIG. 1 includes a central processing unit (CPU) 10, a memory 11, a root complex 12, a connection management mechanism 13, and an input/output (I/O) device 14.

The root complex 12 communicates with the I/O device 14. The connection management mechanism 13 is located on a computer bus that connects the root complex 12 and the I/O device 14.

The I/O device 14 is a device conforming to a computer bus protocol and represents a graphic board (GPU), a network interface card (NIC), a storage device (SATA/NVMe), and the like.

In FIG. 1, a case where one I/O device 14 is included is illustrated, but the number of I/O devices 14 included in the computer 1 is not limited thereto. A case in which a plurality of I/O devices are included in the computer 1 can also be handled, similarly to the present example embodiment.

The connection management mechanism 13 in FIG. 2 is connected to a root complex 12, similarly to FIG. 1. The connection management mechanism 13 in FIG. 2 includes a transaction ID table 131, an access trap function 132, a completion filter function 133, a dummy completion generation/transmission function 134, and a connection detection function 135.

The transaction ID table 131 manages a request packet, based on an I/O device and a unique transaction of each request type.

The access trap function 132 traps a request packet.

The completion filter function 133 prevents a plurality of completion processings from operating for the same transaction. Specifically, when a legitimate return packet is received after the dummy completion generation/transmission function 134 generates and transmits a dummy return packet, the legitimate return packet is discarded.

The dummy completion generation/transmission function 134 generates and transmits a dummy return packet when a delay or a loss occurs in a return packet. Specifically, when a completion is not returned, an appropriate completion is generated and the generated completion is transmitted to a request source.

The connection detection function 135 detects that there is a delay or a disconnection in a connection of a computer bus that links the root complex 12 and the I/O device 14.

A transaction ID table in FIG. 5 includes a device column for discriminating a device, a transaction ID column for discriminating a unique transaction, a timestamp column for storing a time at which a request packet of the transaction is transmitted, and a packet information column for storing a content of the request packet of the transaction.

FIG. 3 illustrates one example of formats of a memory request packet (32 bit), a memory request packet (64 bit), and a request packet (other than memory). A format of a request packet in FIG. 3 includes a type field indicating a type of a request packet, a requester ID where an ID of a request source is described, a tag that is a number for discriminating, when a plurality of requests are issued in parallel, these requests, and a payload that is data in a request packet.

Further, as a destination of a request packet, a destination address is described as a 32-bit address when a 32-bit address space is accessed. As a destination of a request packet, a destination address is described as a 64-bit address when a 64-bit address space is accessed. As a destination of a request packet, a bus/device/function number is described in a header when a destination other than a memory space is accessed.

[Description of an Operation]

Figure 6:
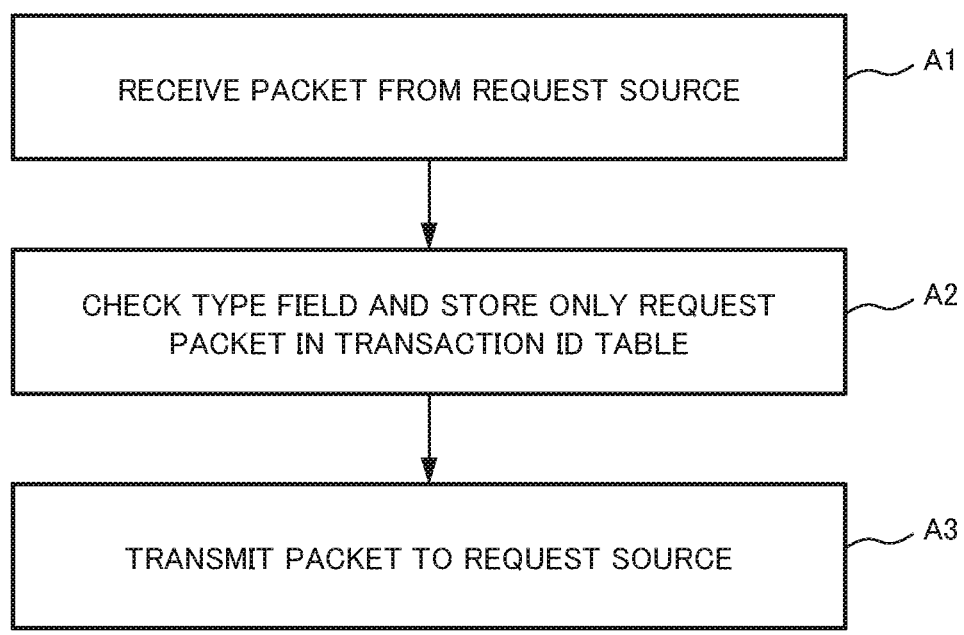
FIG. 6 is a diagram illustrating an operation of an access trap function of the first example embodiment of the present invention.
Figure 7:
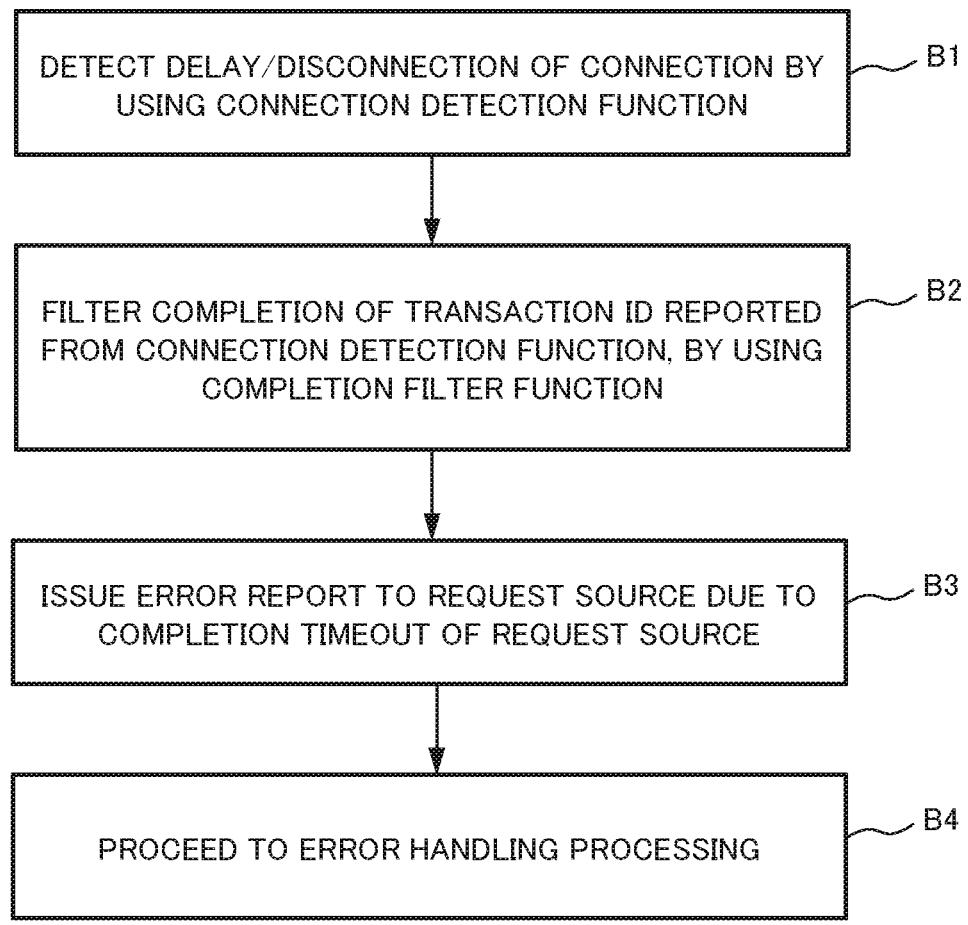
FIG. 7 is a diagram illustrating an operation in which the connection management mechanism of the first example embodiment of the present invention detects a timeout in a computer bus.
Figure 8:
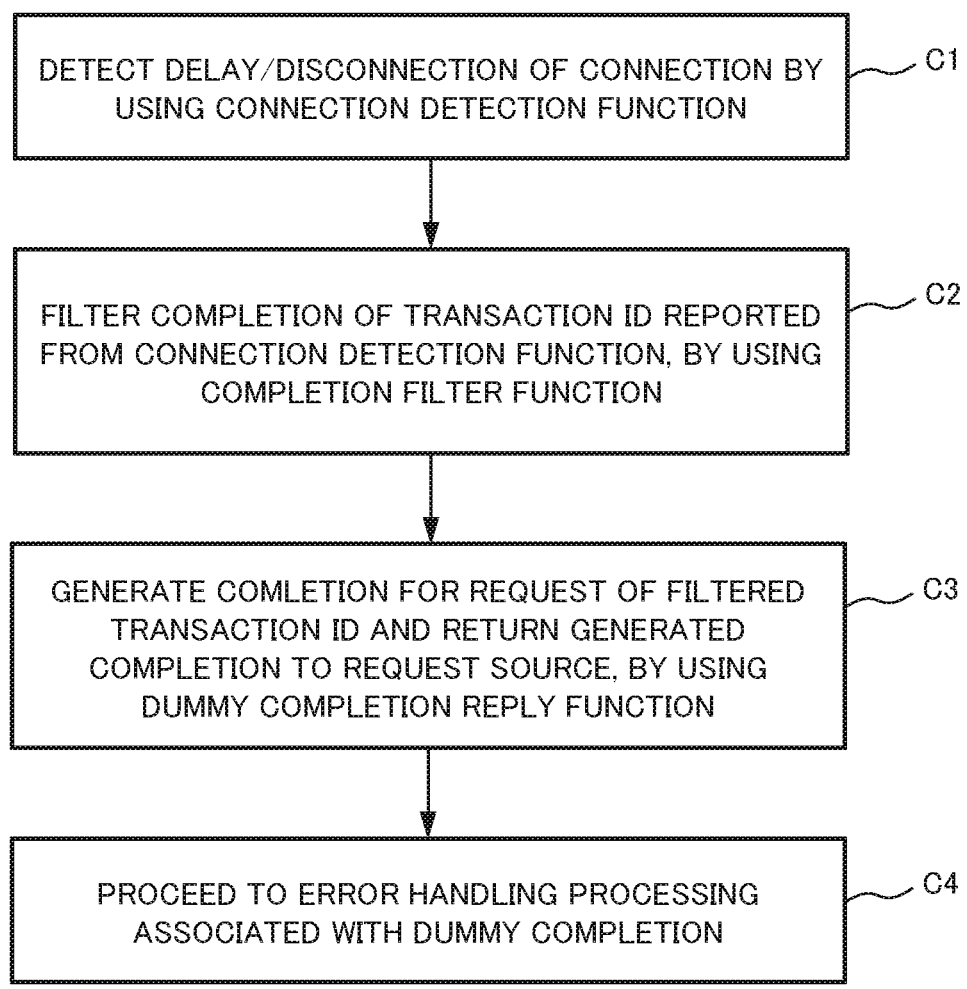
FIG. 8 is a diagram illustrating an operation in which the connection management mechanism of the first example embodiment of the present invention does not detect a timeout in a computer bus.
Figure 9:
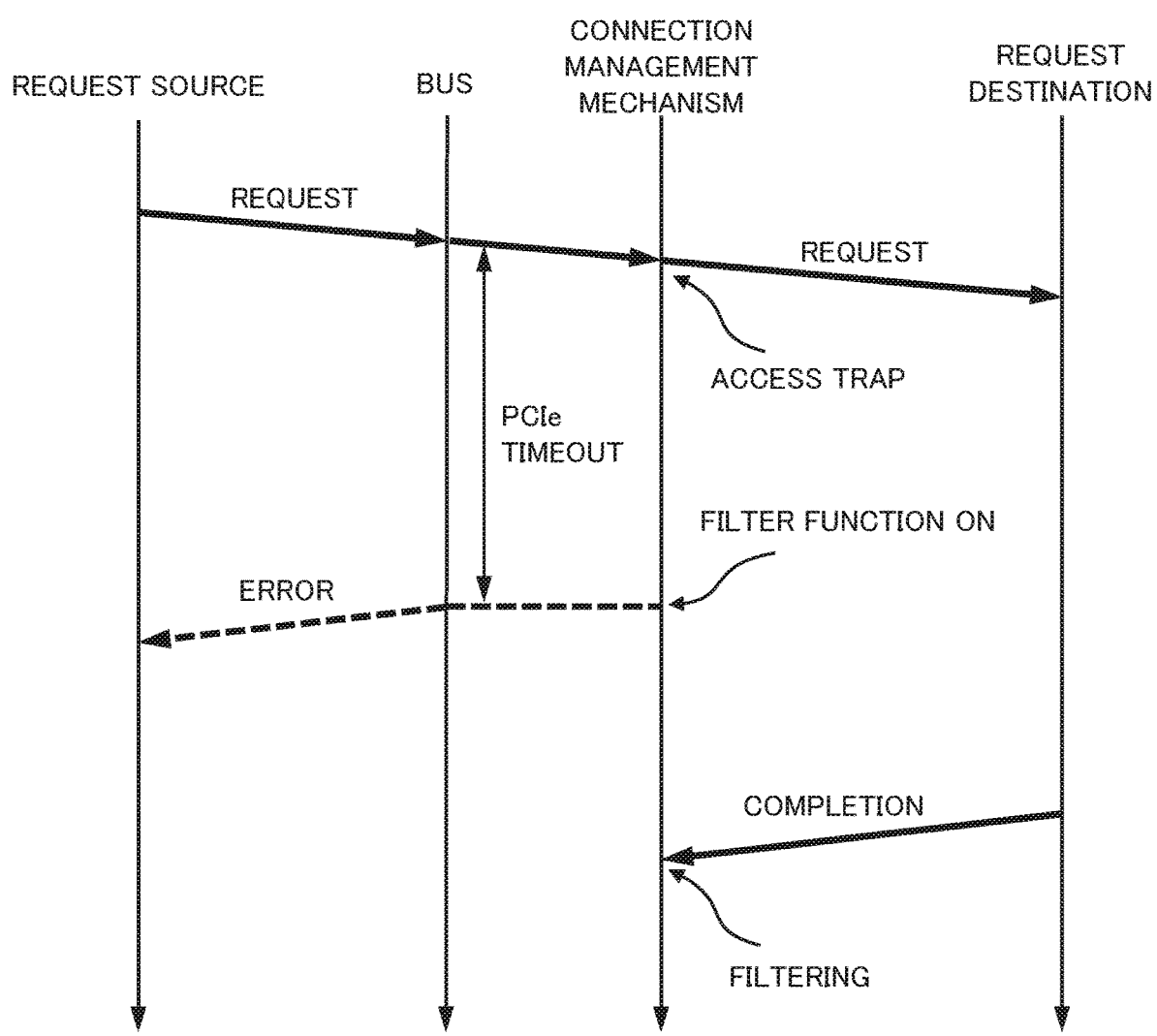
FIG. 9 is a diagram illustrating a flow of a packet when the connection management mechanism of the first example embodiment of the present invention detects a timeout in a computer bus.
Figure 10:
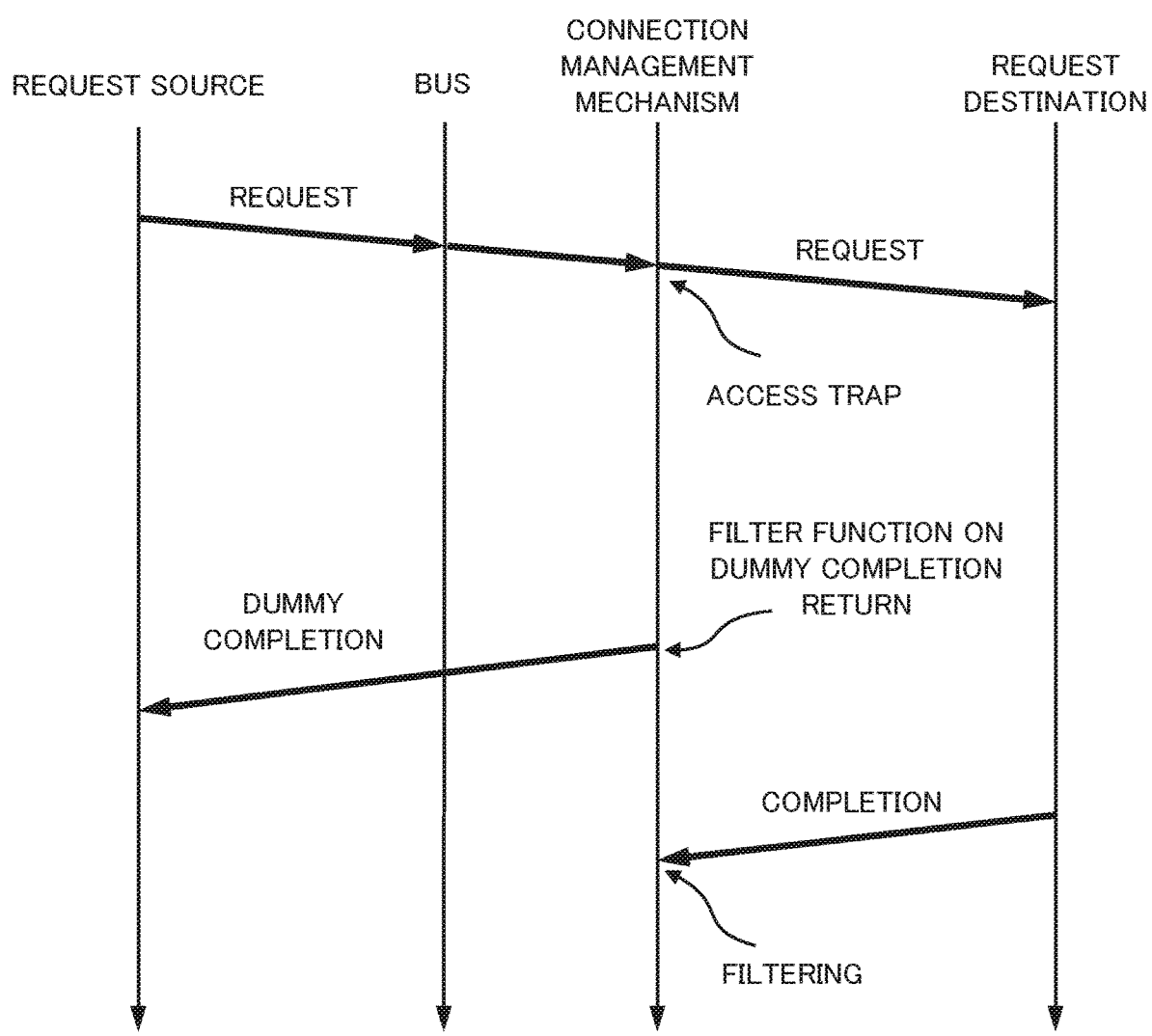
FIG. 10 is a diagram illustrating a flow of a packet when the connection management mechanism of the first example embodiment of the present invention does not detect a timeout in a computer bus.

Next, with reference to flowcharts illustrated in FIG. 6 to FIG. 8 and access flow diagrams of FIG. 9 and FIG. 10, an operation of a transmission terminal of the present example embodiment is described in detail.

First, as a pattern in which a freeze of a computer system occurs, a case in which a request packet generation source executes completion timeout detection is described by using FIG. 6 to FIG. 8.

First, a request source (the root complex 12 or the I/O device 14) transmits a packet to a request destination (the I/O device 14 or the root complex 12). The packet passes through a computer bus and the connection management mechanism 13 and arrives at the request destination.

When receiving a packet from a request source (A1), the connection management mechanism 13 transmits the packet to the access trap function 132.

The access trap function 132 checks a type field of the received packet, extracts only a request packet, and stores the request packet in the transaction ID table 131 (A2). Thereafter, the original request packet is transmitted to a request destination without any change (A3).

When storing the extracted request packet in the transaction ID table 131, the access trap function 132 stores the request packet in a format as illustrated in a transaction ID table in FIG. 5.

A device column indicates an ID of a request destination, and an ID of the root complex 12 or an ID of the I/O device 14 that is a transmission destination of a request packet is recorded.

A transaction ID column is a unique ID of a transaction, and when PCI Express is used as a computer bus, a tag number+an address (32 bit/64 bit) or a tag number+a bus/device/function number are set.

A tag number is a sequence number unique for each request destination device, and in PCI Express, when a completion of the tag number is not returned, a request packet of the same tag number is not transmitted.

An address is a destination address of a request packet and is an address space of a device where a memory space of a PCI Express device is mapped. When management is executed by a 32-bit address, a 32-bit address is set as a destination, and when management is executed by a 64-bit address, a 64-bit address is set as a destination.

A bus/device/function number is a number used except for a request packet for a memory space and is a number necessary for transmitting a request packet to a device that is a request destination.

In a case of PCI Express, a tag+an address (32 bit/64 bit) or a tag+a bus/device/function is used as a unique ID of each transaction, based on a type of a request packet.

A timestamp column is a column indicating a time at which the connection management mechanism 13 receives a request packet.

A packet information column is packet information including header information or payload information other than a transmission ID in a request packet. An entire packet may be stored without a change, or only a designated part may be stored.

Next, an operation in which a completion for a request packet is delayed is described.

First, the connection detection function 135 detects a delay or a disconnection of a connection (B1). The delay and the disconnection of a connection include occurrence of a delay of a computer bus, a link failure, and a failure of a connection. It is assumed that a detection method is, for example, to execute detection by detecting that a difference between a timestamp value of a transaction ID table and a current time being equal to or larger than a certain time T [ms] or to execute detection when an external error detection mechanism reports that there is a failure in a computer bus.

When detecting an error, the connection detection function 135 reports the error to the completion filter function 133. When a delay or a disconnection of a connection is detected from a timestamp value of a transaction ID table, an error is reported with respect to each transaction ID. Further, when there is a failure in a computer bus, an error is reported with respect to each request source device. In this error report, it is assumed that an error is detected earlier than a timeout determined based on a protocol of a computer bus.

The completion filter function 133 filters a completion of a transaction ID reported from the connection detection function 135 (B2). In other words, when receiving a report from the connection detection function 135, the completion filter function 133 refers to a transaction ID and discards a completion packet for a reported transaction upon reception of the packet.

Next, an error is reported to a request source due to a completion timeout of the request source (B3). The request source reports an error with respect to a request packet having no completion, based on a timeout of a protocol of a computer bus. A report destination of the error is mainly the CPU 10, the I/O device 14, or an application program that operates on the CPU 10.

The request source having received the error report proceeds to error handling processing (B4). In other words, the request source having received the error report executes error handling according to the error report. Also, when a legitimate completion packet arrives with a delay after the error handling, the completion filter function 133 filters the legitimate completion. A legitimate return packet is discarded by filtering the completion, and therefore a completion of the same transaction is not doubly returned.

Next, as a pattern in which a freeze of a computer system occurs, a case in which a request packet generation source does not execute completion timeout detection is described by using FIG. 8 and FIG. 9.

The access trap function 132 operates, similarly to A1 to A3 of the flowchart.

First, the connection detection function 135 detects a delay or a disconnection of a connection (C1). The delay and the disconnection of a connection include occurrence of a delay of a computer bus, a link failure, and a failure of a connection. It is assumed that a detection method is, for example, to execute detection by detecting that a difference between a timestamp value of a transaction ID table and a current time being equal to or larger than a certain time T [ms] or to execute detection when an external error detection mechanism reports that there is a failure in a computer bus.

When detecting an error, the connection detection function 135 reports the error to the completion filter function 133 and the dummy completion generation/transmission function 134. When a delay or a disconnection of a connection is detected from a timestamp value of a transaction ID table, an error is reported with respect to each transaction ID. Further, when there is a failure in a computer bus, an error is reported with respect to each request source device. In this error report, it is assumed that an error is detected earlier than a timeout determined based on a protocol of a computer bus.

The completion filter function 133 filters a completion of a transaction ID reported from the connection detection function 135 (C2). In other words, the completion filter function 133 having received an error report refers to, when receiving a report from the connection detection function 135, a transaction ID and discards a completion packet for a reported transaction upon reception of the packet.

Next, a dummy completion reply function generates a dummy completion for a request of the filtered transaction ID and returns the generated dummy completion to a request source (C3). The dummy completion generation/transmission function 134 having received an error report refers to, when receiving a report from the connection detection function 135, a transaction ID and generates a completion for the reported transaction as a dummy completion in a pseudo manner.

An example of a dummy completion generated at that time is illustrated in FIG. 4. A header of a dummy completion includes a type describing a format of a completion, a completer ID of a completion transmission source, a tag number of a request packet, a requester ID that is an ID of a request source, and a payload. A tag number of a request packet and a requester ID that is an ID of a request source are set as the same value as a transaction subjected to error detection, by referring to a transaction ID table. As a type value, a value indicating a completion packet is set. With regard to other fields (the completer ID and the payload), it is assumed that the same value is set by referring to a transaction ID table, or a value arbitrarily determined by a user is set.

The request source having the dummy completion proceeds to error handling processing associated with the dummy completion (C4). In other words, the request source having received the dummy completion executes error processing associated with the dummy completion or continues a normal operation. Thereby, a completion for a request is not returned and a computer system is prevented from freezing.

Further, the connection detection function 135 recognizes whether or not timeout detection is executed based on a protocol of a computer bus and switches between an operation flow in which timeout detection is executed and an operation flow in which timeout detection is not executed. A method for recognizing whether timeout detection is executed based on a computer bus protocol includes a method of executing recognition by referring to setting of an application program that operates on a computer, and a case in which a user executes input as a setting item of the connection management mechanism 13.

Description of an Advantageous Effect

Next, an advantageous effect of the present example embodiment is described.

An advantageous effect of the present example embodiment is that both when a timeout is detected based on a computer bus protocol and when a timeout is not detected, a failure or a freeze can be prevented from occurring in a computer system. A reason for this is that a dummy completion is generated and returned or a completion is filtered in such a way as to prevent a state where a completion for a request packet that passes through a computer bus is not returned or a state where a completion to be returned is doubly returned. Further, an error report method of a connection detection function can be switched according to setting of a computer bus protocol.

Second Example Embodiment

Next, a connection management unit and a connection management method according to a second example embodiment are described. The present example embodiment relates to a computer system including a computer that includes a connection management unit similar to the first example embodiment. An element similar to a corresponding element of the first example embodiment is assigned with the same reference number and detailed description thereof is omitted.

[Description of a Configuration]

Figure 11:
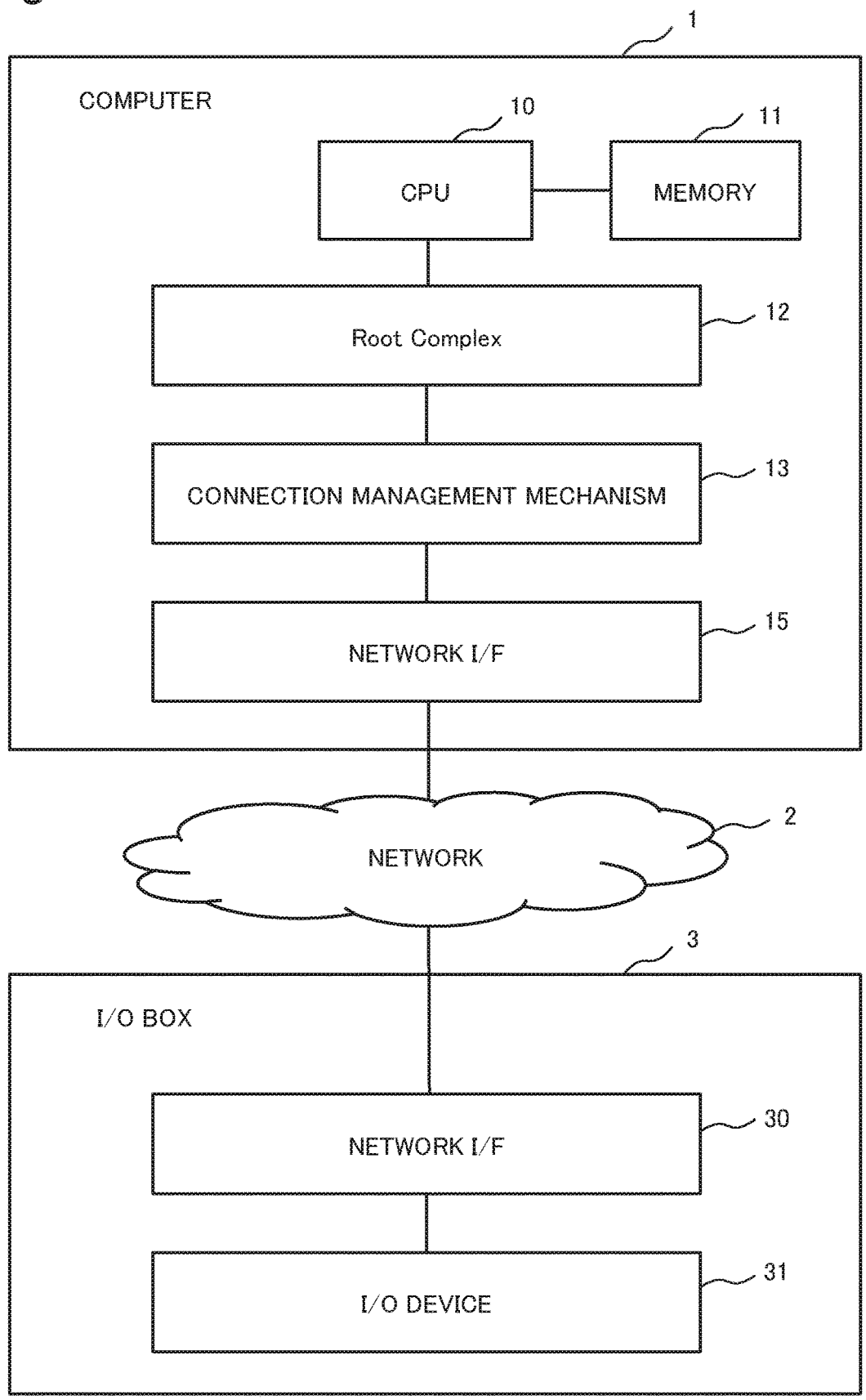
FIG. 11 is a block diagram illustrating a computer system including a connection management unit according to a second example embodiment of the present invention.
(a) of FIG. 12 is a block diagram of an information processing device that achieves a connection management mechanism according to another example embodiment of the present invention, and (b) of FIG. 12 is a block diagram of a connection management mechanism according to another example embodiment.

FIG. 11 illustrates a detailed block of a computer system in the second example embodiment of the present invention. The computer system in FIG. 11 includes a computer 1, an I/O box 3 that accommodates an I/O device, and a network 2 that connects the computer 1 and the I/O box 3.

The computer 1 in FIG. 11 is a computer 1 including a connection management mechanism 13 as one example of a connection management unit, similarly to the first example embodiment of the present invention. The computer 1 of FIG. 11 includes a CPU 10, a memory 11, a root complex 12, and a connection management mechanism 13. Further, the computer 1 in FIG. 11 includes a network interface (I/F) 15.

The CPU 10 operates an application program for communicating with an I/O device 31 of the I/O box 3. The root complex 12 is provided for communication of a computer bus. The connection management mechanism 13 of the present example embodiment manages a connection in computer bus communication, similarly to the first example embodiment.

The network I/F 15 of the present example embodiment encapsulates/decapsulates a computer bus packet generated from the root complex 12 with/from a network packet.

The I/O box 3 connected to the computer 1 via the network 2 includes a network I/F 30 that encapsulates/decapsulates a computer bus packet with/from a network packet, and the I/O device 31.

The network in FIG. 11 indicates a communication network such as Ethernet (Registered Trademark), an IP network, or the like.

In the present example embodiment, a computer bus that connects the root complex 12 and the I/O device 14 of the first example embodiment is overlaid with the network 2. While in FIG. 11, the connection management mechanism 13 is inserted between the root complex 12 and the network I/F 15, an insertion position of the connection management mechanism 13 is not limited thereto. In other words, the connection management mechanism 13 of the present example embodiment may be located in any place between the root complex 12 and the I/O device 31. For example, a case of mounting on a router or a switch in the network 2 and a case of mounting within the I/O box 3 are conceivable. Further, an operation itself of the connection management mechanism 13 is not changed according to a position of the connection management mechanism 13.

[Description of an Operation]

An operation is different only in that communication of a computer bus is overlaid with a network such as Ethernet and the like but is similar to the operation of the first example embodiment described above.

Description of an Advantageous Effect

According to the present example embodiment, similarly to the first example embodiment, both when a timeout is detected based on a computer bus protocol and when a timeout is not detected, a failure or freeze can be prevented from occurring in a computer system. A reason for this is that a dummy completion is generated and returned or a completion is filtered in such a way as to prevent a state where a completion for a request packet that passes through a computer bus is not returned or a state where a completion to be returned is doubly returned. Further, an error report method of a connection detection function 135 can be switched according to setting of a computer bus protocol.

Further, according to the present example embodiment, also in a computer system in which communication of a computer bus is overlaid with a network such as Ethernet and the like, a failure or a freeze can be prevented from occurring in a computer system. In particular, in the present example embodiment, a large fluctuation occurs in a delay since a network such as Ethernet and the like is used, and therefore an advantageous effect of a connection management mechanism that copes with a delay of a completion packet is large.

The Other Example Embodiment

A connection management unit according to each of example embodiments of the present invention described above can also be achieved by an information processing device that can execute a program that achieves such a configuration and operation. This program can be distributed in a form of a computer-readable recording medium. A program recorded on such a recording medium is read and executed by an information processing device, and thereby a function of the present example embodiment may be achieved on a software basis.

Figure 12:
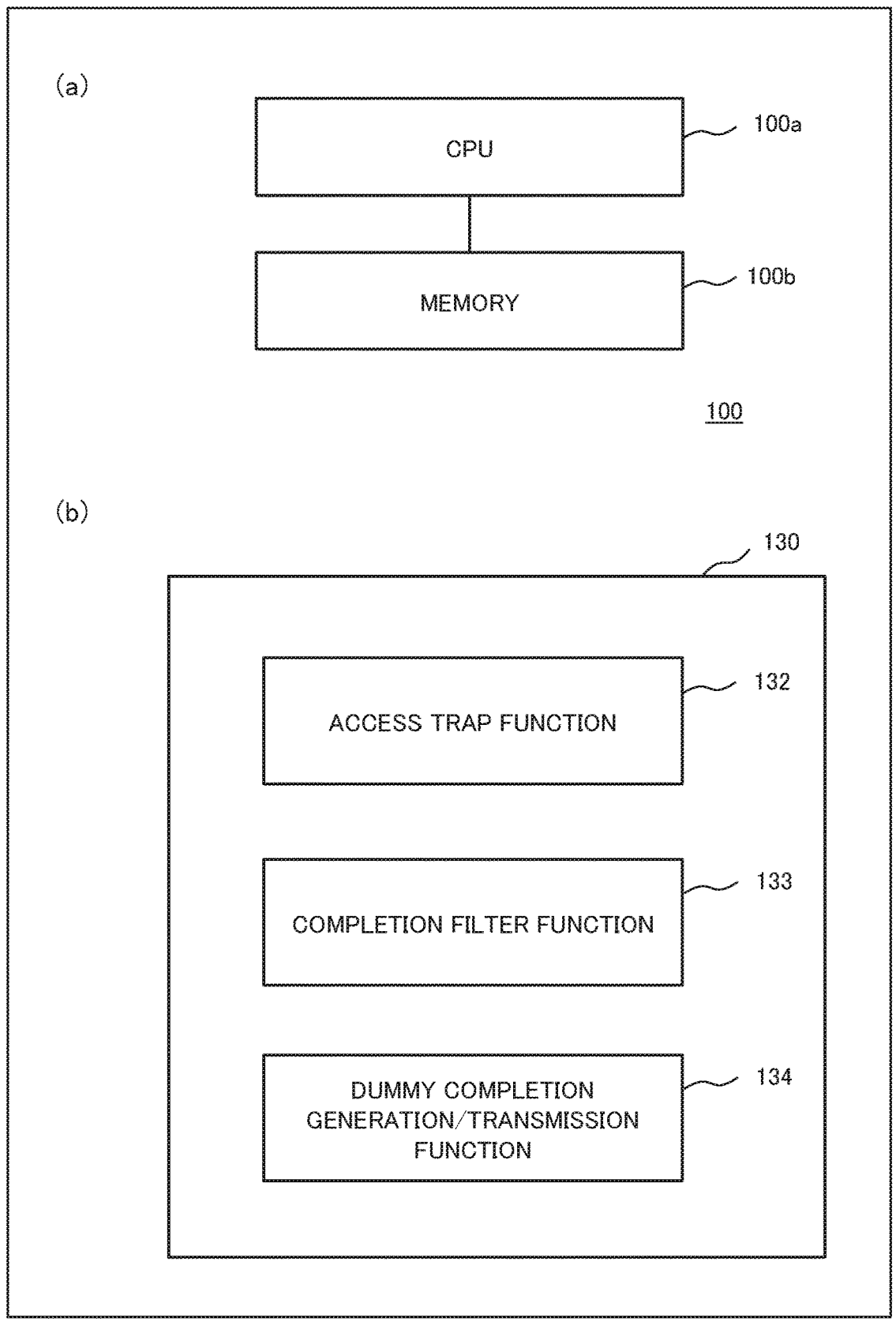
Figure 13:
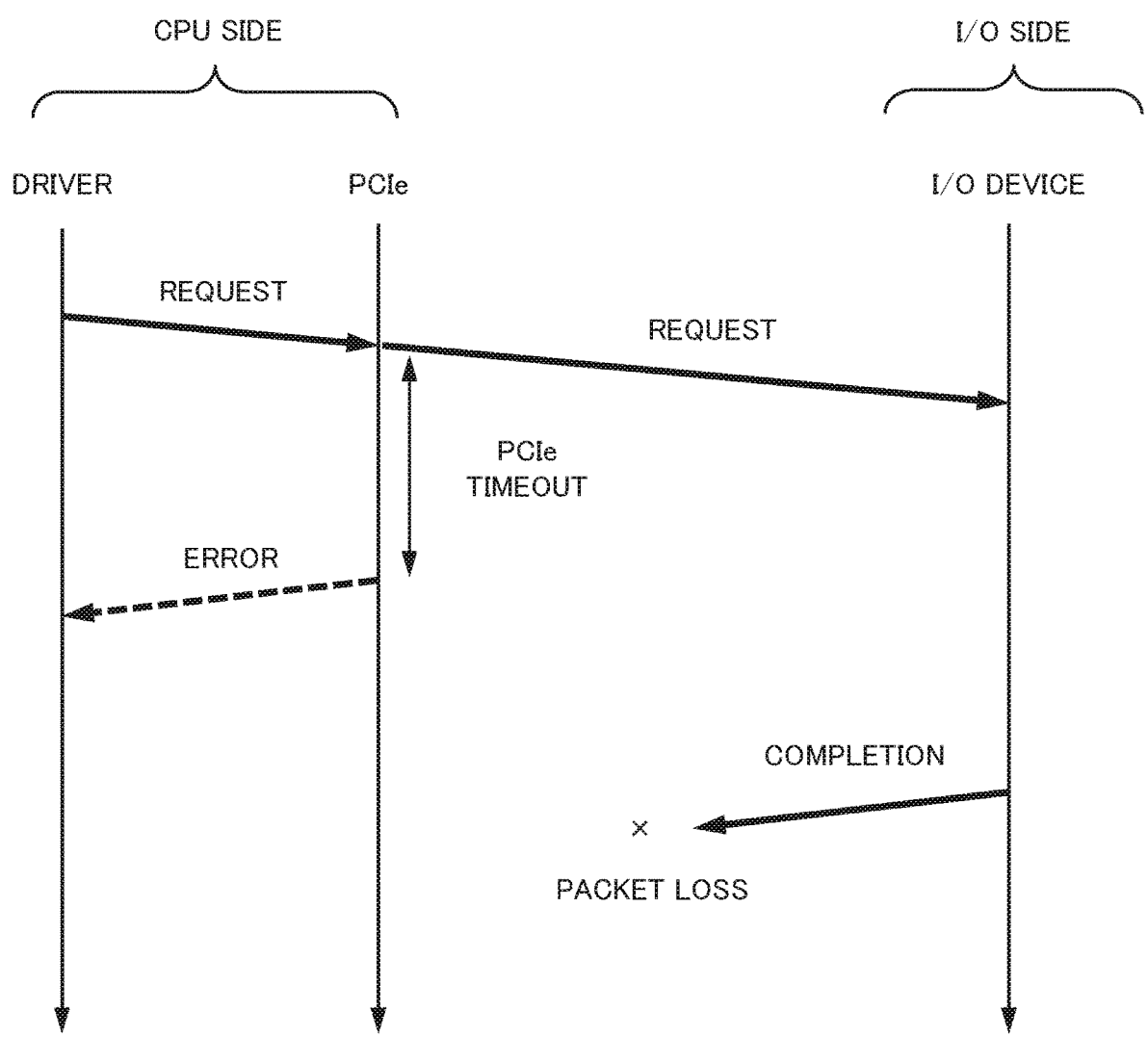
FIG. 13 is an access flow diagram illustrating a case where a timeout is detected in a computer bus and a completion packet is lost.
Figure 14:
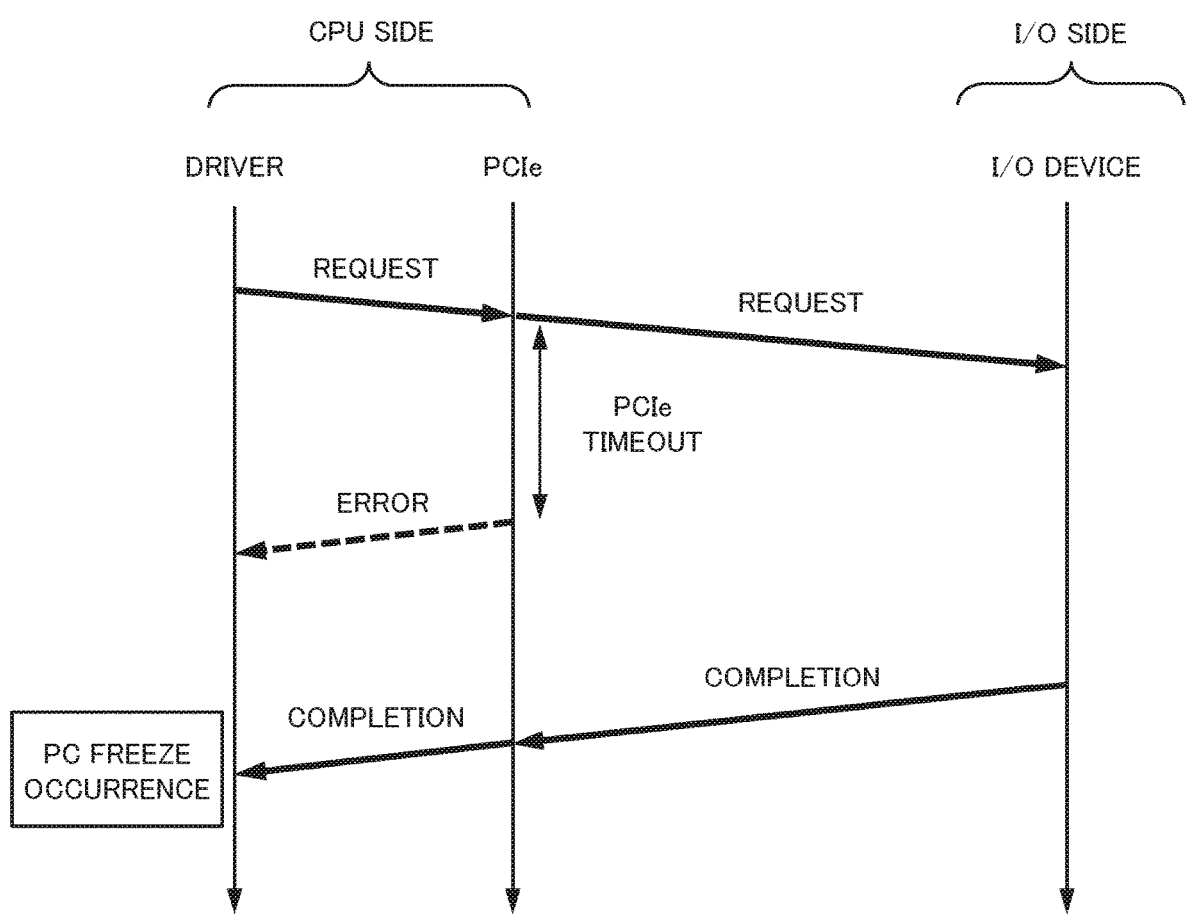
FIG. 14 is an access flow diagram illustrating a case where a timeout is detected in a computer bus and a completion packet arrives with a delay.
Figure 15:
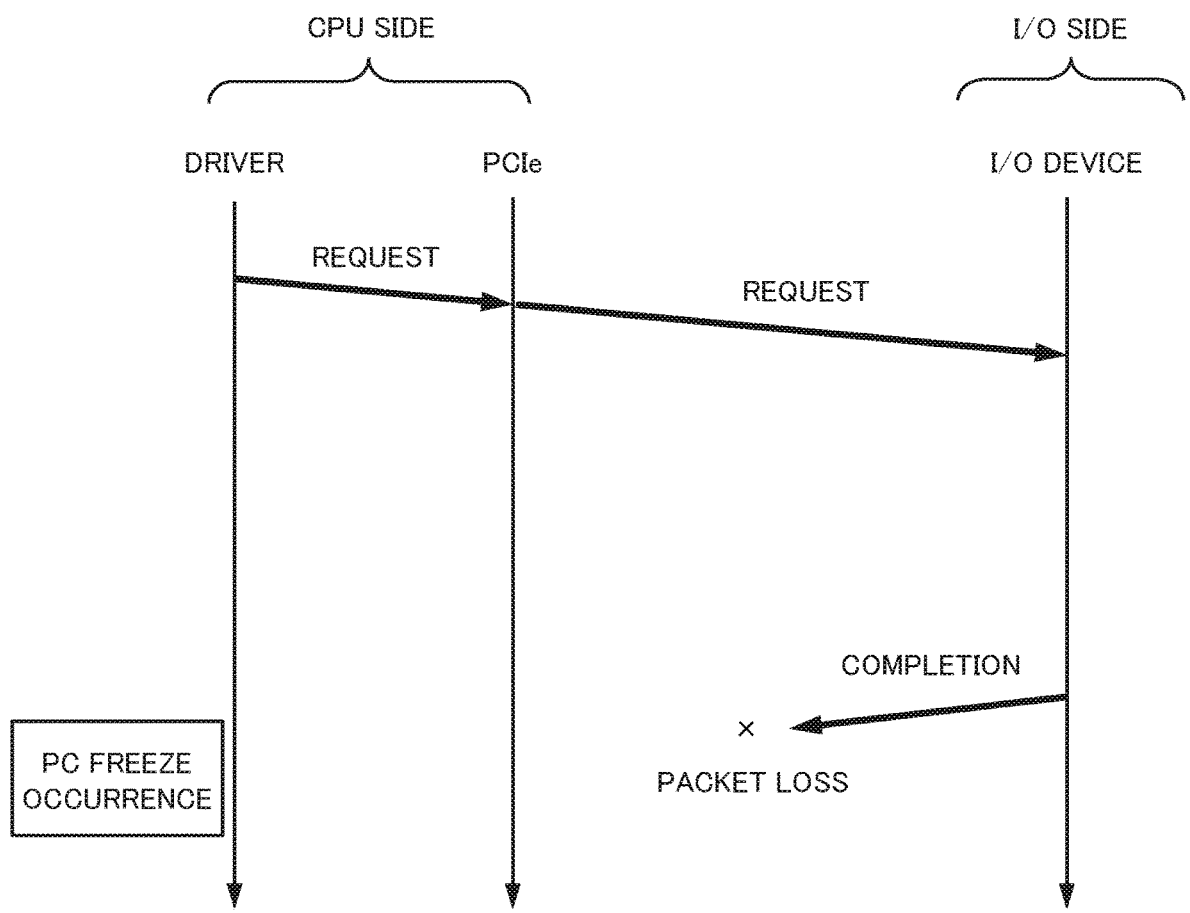
FIG. 15 is an access flow diagram illustrating a case where a timeout is not detected in a computer bus and a completion packet is lost.
Figure 16:
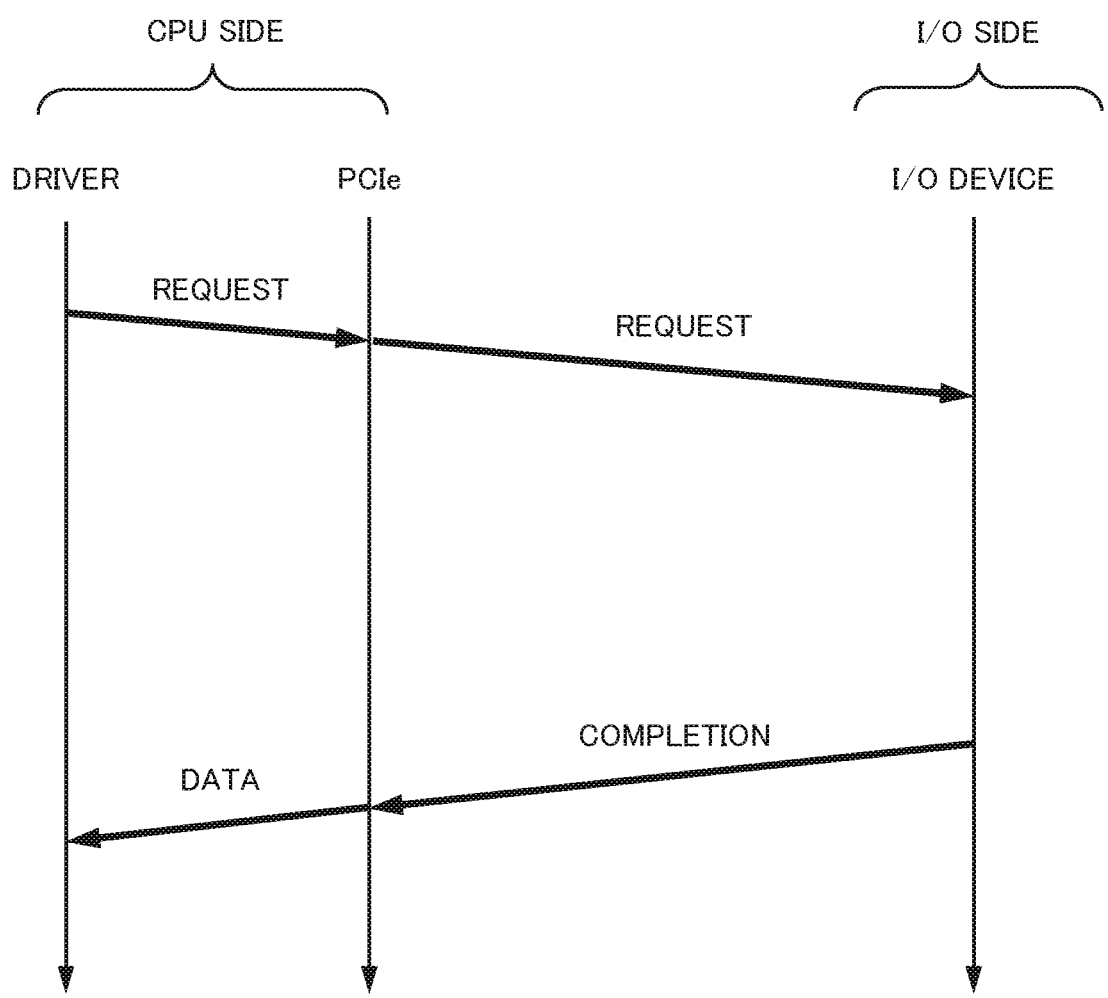
FIG. 16 is an access flow diagram illustrating a case where a timeout is not detected in a computer bus and a completion packet arrives with a delay.

(a) of FIG. 12 is a block diagram of an information processing device 100 that achieves the connection management unit according to another example embodiment of the present invention, and (b) of FIG. 12 is a block diagram of a connection management mechanism according to another example embodiment. The information processing device in (a) of FIG. 12 includes a CPU 100*a* and a memory 100*b*. The connection management mechanism in (b) of FIG. 12 is one example of the connection management unit according to another example embodiment of the present invention and includes an access trap function 132, a completion filter function 133, and a dummy completion generation/transmission function 134.

The connection management mechanism of the example embodiment of the present invention described above can be achieved by the information processing device 100 including such a hardware configuration. In other words, the CPU 100*a* may be configured in such a way to achieve the access trap function 132, the completion filter function 133, and the dummy completion generation/transmission function 134. A program that causes an information processing device to achieve such a function can be distributed in a form of a recording medium recording the program. This program can be distributed in a form of a general-purpose semiconductor recording device such as compact flash (CF) (Registered Trademark), a secure digital (SD), and the like, a magnetic recording medium such as a flexible disk and the like, or an optical recording medium such as a compact disc read only memory (CD-ROM) and the like.

While preferred example embodiments of the present invention have been described, the present invention is not limited thereto. It will be understood by those of ordinary skill in the art that various changes in form and details may be made therein without departing from the spirit and scope of the present invention as defined by the claims.

The whole or part of the example embodiments described above can be described as, but not limited to, the following supplementary notes.

(Supplementary note 1) A connection management unit including: a dummy return packet generation/transmission function that, when, in communication of a computer bus that transmits a packet between a request source and a request destination, a delay or a loss occurs in a return packet transmitted from the request destination, generates a dummy return packet and transmits the generated packet to the request source; and/or a filter function that discards a legitimate return packet arriving from the request destination after transmission of the dummy return packet.

(Supplementary note 2) The connection management unit according to supplementary note 1, further including a connection detection function that enables the dummy return packet generation/transmission function and/or enables the filter function before a timeout defined in accordance with a computer bus protocol occurs.

(Supplementary note 3) The connection management unit according to supplementary note 2, further including a trap function that traps a request packet that passes through the computer bus.

(Supplementary note 4) The connection management unit according to supplementary note 3, further including a function that stores, as a table, a reception time, a transmission source of a packet, a transmission destination of the packet, and an ID that uniquely manages a transaction, being acquirable from the packet that is trapped by the trap function.

(Supplementary note 5) The connection management unit according to supplementary note 4, wherein the dummy return packet is a dummy return packet for a record detected by the connection detection function by referring to the table.

(Supplementary note 6) The connection management unit according to supplementary note 1, further including a function that automatically sets enablement/disablement of the dummy return packet generation/transmission function and the filter function, depending on whether a function that executes timeout detection and issues an error report is enabled or disabled in a computer bus protocol.

(Supplementary note 7) The connection management unit according to supplementary note 6, wherein, when timeout detection is executed and a function that issues an error report is enabled, the dummy return packet generation/transmission function is disabled and the filter function is enabled.

(Supplementary note 8) The connection management unit according to supplementary note 6, wherein, when timeout detection is not executed and a function that issues an error report is disabled, the dummy return packet generation/transmission function is enabled and the filter function is enabled.

(Supplementary note 9) A connection management method including: when, in communication of a computer bus that transmits a packet between a request source and a request destination, a delay or a loss occurs in a return packet transmitted from the request destination, generating a dummy return packet and transmitting the generated packet to the request source; and discarding a legitimate return packet arriving from the request destination after transmission of the dummy return packet.

(Supplementary note 10) A connection management method including: when, in communication of a computer bus that transmits a packet between a request source and a request destination, a delay or a loss occurs in a return packet transmitted from the request destination, issuing an error report to the request source; and discarding a legitimate return packet arriving from the request destination after the error report.

(Supplementary note 11) The connection management method according to supplementary note 9 or 10, further including: trapping a request packet that passes through the computer bus; and storing, as a table, a reception time, a transmission source of the packet, a transmission destination of the packet, and an ID that uniquely manages a transaction, being acquirable from the trapped packet.

(Supplementary note 12) A connection management program used in communication of a computer bus that transmits a packet between a request source and a request destination, the program causing a computer to achieve: a dummy return packet generation/transmission function that, when a delay or a loss occurs in a return packet transmitted from the request destination, generates a dummy return packet and transmits the generated packet to the request source; and/or a filter function that discards a legitimate return packet arriving after transmission of the dummy return packet.

(Supplementary note 13) The connection management program according to supplementary note 12, causing the computer to further achieve a connection detection function that enables the dummy return packet generation/transmission function and/or enables the filter function before a timeout defined in accordance with a computer bus protocol occurs.

(Supplementary note 14) The connection management program according to supplementary note 13, causing the computer to further achieve a trap function that traps a request packet that passes through the computer bus.

(Supplementary note 15) The connection management program according to supplementary note 14, causing the computer to further achieve a function that stores, as a table, a reception time, a transmission source of a packet, a transmission destination of the packet, and an ID that uniquely manages a transaction, being acquirable from the packet that is trapped by the trap function.

(Supplementary note 16) The connection management program according to supplementary note 15, wherein the dummy return packet is a dummy return packet for a record detected by the connection detection function by referring to the table.

(Supplementary note 17) The connection management program according to supplementary note 12, causing the computer to further achieve a function that automatically sets enablement/disablement of the dummy return packet generation/transmission function and the filter function, depending on whether a function that executes timeout detection and issues an error report is enabled or disabled in a computer bus protocol.

(Supplementary note 18) The connection management program according to supplementary note 17, wherein, when timeout detection is executed and a function that issues an error report is enabled, the dummy return packet generation/transmission function is disabled and the filter function is enabled.

(Supplementary note 19) The connection management program according to supplementary note 17, wherein, when timeout detection is not executed and a function that issues an error report is disabled, the dummy return packet generation/transmission function is enabled and the filter function is enabled.

The present invention has been described by using the example embodiments described above as exemplary examples. However, the present invention is not limited to the example embodiments described above. In other words, the present invention can be applied with various forms which can be understood by those of ordinary skill in the art, without departing from the scope of the present invention.

This application is based upon and claims the benefit of priority from Japanese patent application No. 2017-4389, filed on Jan. 13, 2017, the disclosure of which is incorporated herein in its entirety by reference.

REFERENCE SIGNS LIST

1 Computer
10 CPU
11 Memory
12 Root complex
13 Connection management mechanism
131 Transaction ID table
132 Access trap function
133 Completion filter function
134 Dummy completion generation/transmission function
135 Connection detection function
14 I/O device
15 Network I/F
2 Network
3 I/O box
30 Network I/F
31 I/O device

What is claimed is:

1. A connection management unit comprising: when, in communication of a computer bus that transmits a packet between a request source and a request destination, a delay or a loss occurs in a return packet transmitted from the request destination, a filter function that discards a legitimate return packet arriving from the request destination after a dummy return packet is generated and the dummy return packet is transmitted to request source, wherein a header of the dummy return packet includes an ID of a completion transmission source and an ID of the request source, and wherein a tag number of a request packet and the ID of the request source are set to a same value as an ID of a transaction subject to error detection via reference to a transaction ID table.

2. The connection management unit according to claim 1, further comprising a connection detection function that enables a dummy return packet generation/transmission function and/or enables the filter function before a timeout defined in accordance with a computer bus protocol occurs.

3. The connection management unit according to claim 2, further comprising a trap function that traps a request packet that passes through the computer bus.

4. The connection management unit according to claim 3, further comprising a function that stores, as a table, a reception time, a transmission source of a packet, a transmission destination of the packet, and an ID that uniquely manages a transaction, being acquirable from the packet that is trapped by the trap function.

5. The connection management unit according to claim 4, wherein the dummy return packet is a dummy return packet for a record detected by the connection detection function by referring to the table.

6. The connection management unit according to claim 1, further comprising a function that automatically sets enablement/disablement of a dummy return packet generation/transmission function and the filter function, depending on whether a function that executes timeout detection and issues an error report is enabled or disabled in a computer bus protocol.

7. The connection management unit according to claim 6, wherein, when timeout detection is executed and a function that issues an error report is enabled, the dummy return packet generation/transmission function is disabled and the filter function is enabled.

8. The connection management unit according to claim 6, wherein, when timeout detection is not executed and a function that issues an error report is disabled, the dummy return packet generation/transmission function is enabled and the filter function is enabled.

9. A connection management method comprising: when, in communication of a computer bus that transmits a packet between a request source and a request destination, a delay or a loss occurs in a return packet transmitted from the request destination, generating a dummy return packet and transmitting the generated packet to the request source; and discarding a legitimate return packet arriving from the request destination after transmission of the dummy return packet, wherein a header of the dummy return packet includes an ID of a completion transmission source and an ID of the request source, and wherein a tag number of a request packet and the ID of the request source are set to a same value as an ID of a transaction subject to error detection via reference to a transaction ID table.

10. The connection management method according to claim 9, further comprising: trapping a request packet that passes through the computer bus; and storing, as a table, a reception time, a transmission source of the packet, a transmission destination of the packet, and an ID that uniquely manages a transaction, being acquirable from the trapped packet.

11. A non-transitory computer-readable recording medium for recording a connection management program used in communication of a computer bus that transmits a packet between a request source and a request destination, the program causing a computer to achieve:
- when a delay or a loss occurs in a return packet transmitted from the request destination a filter function that discards a legitimate return packet arriving after a dummy return packet is generated and the dummy return packet is transmitted to the request source,
- wherein a header of the dummy return packet includes an ID of a completion transmission source and an ID of the request source,
- and wherein a tag number of a request packet and the ID of the request source are set to a same value as an ID of a transaction subject to error detection via reference to a transaction ID table.

12. The non-transitory computer-readable recording medium for recording a connection management program according to claim 11, causing the computer to further achieve:
- a connection detection function that enables a dummy return packet generation/transmission function and/or enables the filter function before a timeout defined in accordance with a computer bus protocol occurs.

13. The non-transitory computer-readable recording medium for recording a connection management program according to claim 12, causing the computer to further achieve:
- a trap function that traps a request packet that passes through the computer bus.

14. The non-transitory computer-readable recording medium for recording a connection management program according to claim 13, causing the computer to further achieve:
- a function that stores, as a table, a reception time, a transmission source of a packet, a transmission destination of the packet, and an ID that uniquely manages a transaction, being acquirable from the packet that is trapped by the trap function.

15. The non-transitory computer-readable recording medium for recording a connection management program according to claim 14, wherein the dummy return packet is a dummy return packet for a record detected by the connection detection function by referring to the table.

16. The non-transitory computer-readable recording medium for recording a connection management program according to claim 11, causing the computer to further achieve:
- a function that automatically sets enablement/disablement of a dummy return packet generation/transmission function and the filter function, depending on whether a function that executes timeout detection and issues an error report is enabled or disabled in a computer bus protocol.

17. The non-transitory computer-readable recording medium for recording a connection management program according to claim 16, wherein, when timeout detection is executed and a function that issues an error report is enabled, the dummy return packet generation/transmission function is disabled and the filter function is enabled.

18. The non-transitory computer-readable recording medium for recording a connection management program according to claim 16, wherein, when timeout detection is not executed and a function that issues an error report is disabled, the dummy return packet generation/transmission function is enabled and the filter function is enabled.

* * * * *